Sept. 3, 1968  J. R. BENSON  3,399,608
METHOD FOR SOIL STABILIZATION WITH IMPROVED EMULSION ASPHALT
Filed March 1, 1967

INVENTOR.
Jewell R. Benson
BY
ATTORNEYS

United States Patent Office 3,399,608
Patented Sept. 3, 1968

3,399,608
METHOD FOR SOIL STABILIZATION WITH IMPROVED EMULSION ASPHALT
Jewell R. Benson, 1111 S. Colorado Blvd., Denver, Colo. 80222
Filed Mar. 1, 1967, Ser. No. 619,758
6 Claims. (Cl. 94—23)

ABSTRACT OF THE DISCLOSURE

This disclosure concerns the blending of an emulsified asphalt with soil materials to provide stabilized soil structures. A very hard asphalt is used, characterized by low penetration and a comparatively low softening point temperature. This asphalt is softened with a small amount of a volatile solvent to produce a solid asphalt at normal temperatures which is comparable with standard paving grade asphalts. The emulsions of this softened hard-type asphalt when blended with soil produces a product initially similar to that produced by standard paving grade asphalts, but cures to a structure having a remarkably high ultimate stability and strength.

---

This invention relates to soil stabilization with asphalt and more particularly to soil stabilization with emulsified hard-base asphalts.

An object of the invention is to provide a novel and improved soil structure, such as a road bed, by interblending a soil of earth, sand, gravel or mixtures thereof, with a selected emulsified hard-base asphalt.

Another object of the invention is to provide, in a method of forming a road bed or like structure of soil and/or aggregate materials, by interblending the materials with selected emulsified asphalts, a product of enhanced strength and stability.

Another object of the invention is to provide an improved emulsion using a selected softened, very hard-asphalt which is interblended into soil and/or aggregate materials to form a novel structure, which, first, is an easily-worked product, and later sets and hardens to a high strength structure.

A further object of the invention is to provide an improved stabilized soil structure, such as a road bed, by blending the sand and aggregate materials found in situ with an improved, softened and emulsified hard asphalt, which completely eliminates the need for adding to the in situ materials any imported, expensive fines or other sand or aggregate materials in order to obtain stability of the structure.

Another object of the invention is to provide a novel and improved method for forming an asphalt stabilized soil structure by blending selected emulsified asphalts with the soil in a manner which permits an optimum design of the structure at a minimum over-all cost for materials and labor.

Another object of the invention is to provide a novel and improved method of forming a high-strength stabilized soil structure by interblending an improved, softened and emulsified hard asphalt with a soil which produces, initially, a blend which is easily mixed, spread, bladed and compacted prior to attaining durability, hardness and strength.

Another object of the invention is to provide a soil structure by using a selected, hard type of asphalt, which structure has high strength and stability and also exhibits a surprising degree of resilience and toughness and is well adapted for use as a base or surface for a road and the like.

With the foregoing and other objects in view, my present invention comprises certain constructions, combinations and arrangements of materials, and sequences, operations and steps, all as hereinafter described in detail, defined in the appended claims, and supplemented by the accompanying drawing in which:

Figure 1:
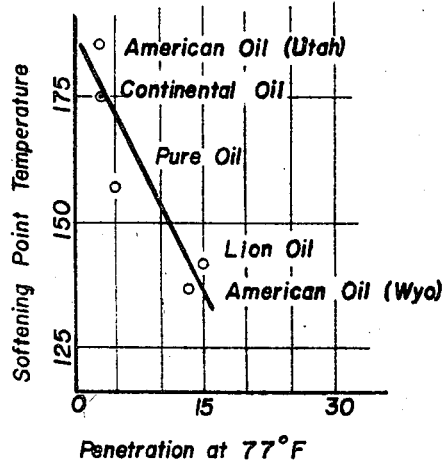
FIGURE 1 is a chart showing the relationship of penetration to softening point characteristics of asphalts suitable for the present invention.

The present invention involves mixing a selected, emulsified hard-base asphalt, as hereinafter specified, with soil materials to produce an improved, stabilized soil structure of asphalt-soil blend, such as a road base. The term "soil" is used broadly herein to include earth and granular rock particles, either natural or manufactured, and either in situ or imported. When blending according to the invention, the improved soil structures, roads for example, have a strength and stability which far exceeds that of comparable soil structures stabilized with conventional asphalt emulsions.

The present invention is an outgrowth of my previous invention, an asphaltic penetrative binder, disclosed in Patent No. 3,216,336, issued Nov. 9, 1965. That disclosure relates to the use of a very hard asphalt, having a penetration less than 25, cut back with a volatile solvent to a fluid material which is applied to the surface of a road or like structure to soak into the road surface and to subsequently set up when the solvent evaporates. The development of that invention was based upon the indication and assumptions that very hard asphalts, as such, could not be easily dispersed in a soil structure at ambient temperatures, and would not adhere and bond to soil particles. The discovery was that dispersion, adhesion and bonding could be attained when the material was cut back to a low viscosity fluid.

Attempts to use a cutback of this type for other than surface applications were generally failures. In surface applications, the degree of absorption or penetration into surface layers of a soil material is so related to the porosity of the soil that after absorption of the cutback, the volatile diluent can easily evaporate from the surface. A structure formed by mixing this cutback with soil, as in a pug mill, and then placing and compacting the mixture to a layer several inches thick will usually have its pores clogged with the cutback asphalt to the point where the diluent cannot escape except over a long period of time, during which the structure will have little stabiilty. For example, a filling station drive area in Denver, Colorado, was constructed by mixing and placing a 6-inch layer of aggregate-soil binder and the fluid hard-base cutback asphalt. The drive area was placed during Oct. and Nov. of 1964. It first appeared to be successful, however, in May of 1965, it failed completely with exudation of uncured, fluid asphalt to the surface of the pavement.

Others have proposed blending very hard asphalts with soils as in a pug mill, by heating the asphalt and soils to a temperature sufficient to render the asphalt fluid, blending the materials and thereafter placing and compacting the material in a road surface while the asphalt is still hot. Abraham in his publication "Asphalts and Allied Substances," disclosed a material formed in this manner. However, such a blend is useful only for very limited applications since the temperatures required to melt such asphalt to a fluidity suitable for mixing, more than 400° F., are far too high for safety in field installations. Moreover, such high temperatures cause severe deterioration of the asphalt. Also, cooling of such a very hot mix as it is transported, placed and compacted will be so critical as to congeal the asphalt and render the mix too stiff to be worked.

The present invention in its basic conception, proposed to reduce the amount of volatile solvent in a cutback of this hard asphalt to an extent which would still render the very hard asphalt capable of yielding, migrating and adhering to soil particles, but at the same time eliminate enough solvent to avoid the problem of getting rid of the solvent as by evaporation after the mixed material was placed and compacted as a finished structure.

A dilemma developed when it was found that the amount of solvent which could be blended with the hard-base asphalt and still avoid the solvent-evaporation problem was so small that a fluid cutback could not be produced. The resultant asphalt blends, though softer than the undiluted hard asphalt, had a hardness comparable with solid asphalts of ordinary paving grade consistency. Obviously, the desirable, solid, solvent-softened asphalts could not be mixed at normal temperatures. A conventional paving grade asphalt will be heated to fluidity, then mixed with soil in a pug mill, transported therefrom, laid in place and compacted while it is still hot; however, the solvent-softened, solid asphalt could not be so heated. Heating and mixing at the necessary high temperatures would result in the immediate loss of the volatile solvent with the danger of fire and explosion and then produce a soil-asphalt mixture utterly impossible to handle.

The conception of a desirable blend was realized and the invention reduced to practice when the selected hard asphalt, softened to the consistency of a paving grade asphalt, was emulsified with water, with the water forming the continuous phase of the emulsion. As such, it was comparable with common types of asphalt emulsions formed from solid, ordinary paving grade types of asphalts.

When so compared with such conventional asphalts, not only did the soil structures, blended with the selected emulsified, softened, hard asphalt demonstrate that the asphalt particles would migrate and adhere to and bind the soil particles but also, that the final structure would have an unprecedented high strength and stability. The structure further exhibited the property of having, initially, a lower stability for a short time, and the softened asphalt could be blended to provide in the structure, first of all, properties which were comparable with those of structures using conventional types of emulsified asphalts. A further unexpected advantage was that the need to import special soil mixes or other materials to improve the soil materials in situ was substantially eliminated. Ordinarily, it is necessary to add fines to the soil materials in situ in stabilizing such soils with conventional emulsified asphalts, "fines" being those small particles which pass a No. 40 sieve, and especially those particles which pass a 200 sieve. Actually, by using the selected, softened, hard asphalt a stable soil structure can be made with practically any soil in situ except those soils which cannot be pulverized sufficiently to permit mixing.

The improved emulsified cutback asphalt can be easily custom-blended for use in either hot weather or cold weather. By using selected amounts and types of volatiles, it is possible to produce an easily workable soil blend of any desired initial stability by simply restricting the amount of diluent to make the hard base asphalt at first comparable to a selected conventional penetration grade asphalt having known properties when used as an emulsion. Thereafter, the blend produced with the hard asphalt will set and harden to an ultimate high strength and stability not attainable with the conventional penetration grade asphalt.

The improved emulsion is prepared from a softened, hard asphalt by any conventional process of forming an emulsion of water and bitumen, with the water being the continuous phase and the bitumen suspension therein being stable, but easily broken during mixing with a soil. The art of producing emulsions is well known and details thereof need not be disclosed herein.

The asphalts which may be used for the improved emulsion are best designated by their penetration, and by their softening point temperatures. Penetration, a hardness indication as herein referred to, is defined by the standardized test designated as A.S.T.M. D 5–61, 77° F., 100-gram load, 5 seconds, described in A.S.T.M. Standards 1961, part 4, page 1144. The softening point temperature in degrees F. is obtained by a procedure known as A.S.T.M. D-36–64T ring and ball test. The hardness of the asphalt base material herein disclosed is considered as being equivalent to the hardness of the distillation residue which is obtained by heating the material to 680° F. as per A.S.T.M. test method D-402.

The softened asphalt referred to is formed by the selected asphalts blended with small amounts of volatile petroleum solvents, to penetrations between 40 and 300.

The types of asphalt adapted for use in the present invention are hard asphalts having a penetration less than 25 and a comparatively low softening point temperature. This includes the solvent refined asphalts and vacuum straight reduced asphalts such as disclosed in my patent No. 3,216,336. FIGURE 1 shows the relationship of penetration to softening point temperature for a representative group of desirable asphalts which can be obtained at refineries as follows:

| Source | Pen. at 77° F. | Soften Point,° F. |
|---|---|---|
| Continental Oil, Billings, Montana | 3 | 175 |
| Lion Oil, El Dorado, Arkansas | 15 | 145 |
| Pure Oil, Naches, Texas | 5 | 214 |
| American Oil, Casper, Wyoming | 13 | 210 |
| American Oil, Salt Lake City, Utah | 3 | 185 |

The general definition as set forth in the prior patent, an asphalt having a penetration of less than 25 at 77° F. and a softening point temperature in degrees F. of approximately 185 less three times the penetration, is applicable in the present invention to insure the production of a good quality product.

The diluent to form the softened asphalt, as set forth in the prior patent, is any volatile petroleum solvent, such as naphtha, gasoline or kerosene or any combination thereof, having a volatility at least not substantially less than that of kerosene. In the present invention the amount of diluent blended with asphalt is not great and it is not feasible to express the same as a percent of the blend. A more appropriate designation lies in the requirement that the softened, hard asphalt have sufficient diluent to produce any selected penetration, between 40 and 300.

Figure 2:
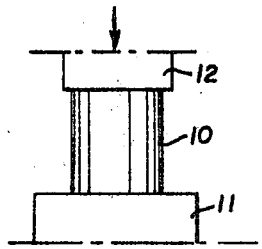
FIGURE 2 is a diagrammatic sketch of a test specimen and the platens of a standard test apparatus used for determining stability of the specimen.

The basic properties of invention were shown by an example of an asphalt-soil blend made with the improved materials and compared with asphalt-soil blends made with conventional types of emulsified asphalts. A number of cylindrical specimens of both types were formed using varying amounts of emulsion. The specimens were compacted and cured in a manner which simulated field conditions, all according to a set test procedure. The strength of the specimens was established by compression tests which were made from time to time as the curing progressed. Testing apparatus similar to the apparatus diagrammatically indicated at FIG. 2 was used. The cylindrical specimen 10, at FIG. 2, was mounted upright upon a base 11, and platen 12 moved downwardly and against the specimen at a selected slow rate. Means associated with this movement measured the force to cause failure of the specimen to thereby establish its strength and stability.

The improved emulsion was prepared from a solvent refined asphalt having a penetration of 3 and a softening point of 175° F. This material, produced by the Continental Oil Company at Billings, Montana, was softened by blending it with a naphtha-kerosene cutter to a penetration of 225. This softened asphalt, equivalent in many respects to an ordinary paving grade asphalt having a penetration of 225, was easily emulsified with water. The emulsified asphalt was thereafter stable until it was used, but it easily broke when mixed with soil particles.

It is to be noted that the selected softened asphalt, having a 225 penetration, used for the example, is possibly softer than what would ordinarily be desired for field use unless a high proportion of fines were in the soil. The conventional asphalt emulsions, for comparison tests, were made with asphalts having a penetration of 40–50 and of 120–150. These asphalts, harder than the 225 penetration softened asphalt, were known to be the most suitable of conventional types for the soil used in the tests.

The soil material used for these specimens was selected from the vicinity of Eads, Colorado, and is commonly referred to as Eads sand. This Eads sand was selected as being typical of many types of soil materials which require stabilization. It has a fairly high void content, of approximately 21 percent, some fines, and very little natural stability. It is of a type classified by the Bureau of Public Roads as Classification A–2–4. Accordingly, the stability of the soil blend would primarily represent that attained due to the addition of the asphalt. However, a certain degree of stability is imparted by a matrix formed by a blending of the fines with the asphalt. In normal field operation especially where an asphalt having a penetration as high as 225 is used in the emulsion, it is necessary to add fines to the Eads sand to obtain acceptable stability.

Several blends of the Eads soil and varying amounts of the emulsified, softened, hard asphalt were first observed visually. The appearance of these blends differed little from that which would be expected using blends of the Eads sand and conventional emulsified asphalts where a 225 penetration asphalt was used. It would appear that the blends using the softened, hard-base asphalt had little initial stability and that fines would be required, the same as if the blend used were a regular 225-penetration asphalt. Likewise, the blends prepared with conventional asphalt emulsion appeared as would be anticipated for asphalts having a penetration of 40–50 and 120–150. It is to be noted a soil structure formed with such conventional asphalt emulsions will quickly approach approximately 50 percent of its maximum stability because the character of the asphalt itself will not change.

To obtain a quantitative measure of the strength of the improved blend and a comparison with the other materials, a number of cylindrical test specimens were formed, compacted and cured for different periods of time. The specimens using emulsified softened hard-base asphalt included four groups having varying amounts of base asphalt with respect to the soil. By weight, the amount of asphalt in the respective groups was 4, 6, 8 and 10 percent of the sample.

Volumetrically, the amount of asphalt in the respective groups was approxiatemly 9.2, 14.3, 18.5 and 23 percent. To obtain sufficient moisture in the soil to produce a workable blend, the leaner mixture of emulsion, the 4 percent amount, required additional water. Also, some water was required when the 6 percent amount was blended with the sand. On the other hand, the 8 percent amount did not require any water, and the 10 percent blend was unworkable because of excess amounts of both water and asphalt. It is to be noted that the 10 percent amount of asphalt, 23 percent by volume, exceeded the void content of the material and that the 8 percent amount was within a few percent of filling the void of the material.

The test results of soil-asphalt blends of the 225-penetration cutback asphalt above described were compared by preparing similar specimens for tests using the Eads sand with conventional types of asphalt emulsions, one group being formed with the conventional SS–1 paving grade asphalt having a penetration of 120–150 and another group with conve ntional SS–1H paving grade asphalt having a penetration of 40–50. The same proportions were selected to produce 4, 6 and 8 percent of residual amounts of asphalt when cured. These conventional emulsion blends, when mixed with the Eads sand behaved much as would be expected.

Figure 3:
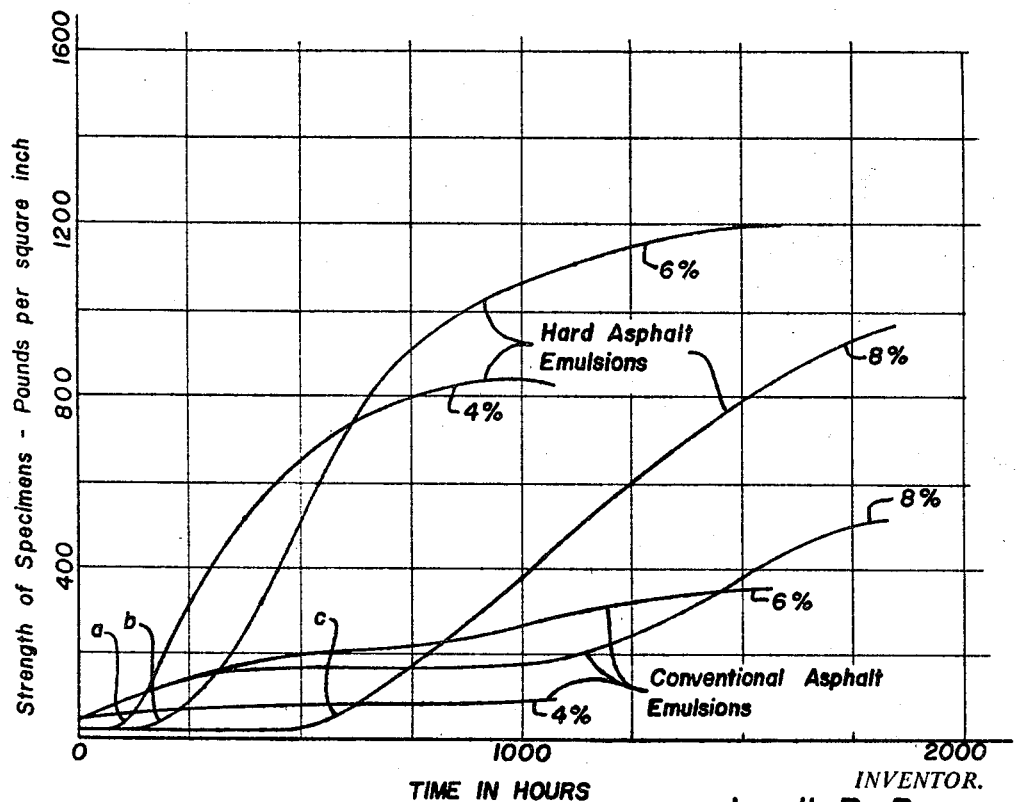
FIGURE 3 is a chart showing the relation of stability to cure time for soils stabilized with different proportions of conventional emulsified asphalts and emulsified asphalts prepared according to the invention.

The significant properties of the improved blend using the softened, hard asphalt emulsions, as compared with blends of conventional asphalt emulsions, are shown at FIG. 3. The stability of soil blends of conventional asphalt material showed, for the most part, no significant difference between that of the 40–50 penetration type asphalt and that of the 120–150 penetration type asphalt. Such an action would indicate that the small particles in the Eads soil ordinarily referred to as "fines" were combining with the asphalts to produce an action akin to that obtained by the conventional practice of adding fines to a sandy soil to form a matrix with the asphalt and to produce stability in an otherwise unstable material. Without such an action, the actual stability of the soil-asphalt blend would be must less than the indicated results since the soft asphalt would then act as a lubricant between soil particles, decreasing stability.

The specimens using the emulsified, softened, hard asphalt initially behaved much as would be anticipated if an asphalt having a penetration of 225 were blended with these soil constituents. The initial stability was appreciably less than that observed by the specimens blended with the conventional types of emulsified asphalts having lower pentration (120–150 and 40–50 penetration), and apparently the fine particles naturally present in the Eads sand were insufficient to effect stabilization with this soft material. Ordinarily, if a very soft asphalt is used with a sand of the Eads type, fines must be added to the blend to obtain stabilization and in field installations, Eads sand and similar types of soil will require as much as 20 percent fines to provide stabilization.

The tests showed that this initial low stability of the blends, using the emulsified, softened, hard-asphalt would persist until volatilization of the diluents caused the asphalt to harden. Then the stability of the blends would increase to high values. It is to be noted that the increase of stability did not commence immediately and that the time elapsing before stability commenced is influenced by the amount of emulsified asphalt in the blend. This is shown at FIG. 3 by points $a$ and $b$ for the 4 percent and 6 percent asphalt blends, and point $c$ for the 8 percent blend.

This period of low stability can be advantageously used to permit mixing and placing of the material before it commences to harden, and is suggestive of the practice where conventional asphalt emulsions are cut back with diluents for this purpose. Moreover, with present invention, the actual initial stability of any such soil blend can be controlled by specifying the penetration of the softened, hard asphalt. A hard asphalt, softened to a high penetration, such as that used, is suitable for blending with a material such as Eads sand where it is desired to have a very low stability at first so that it may be easily workable during the operations of mixing hauling, placing and spreading. It may be more desirable to have an asphalt softened to a lower penetration such as a 40–50 or 120–150 penetration where a higher initial stability is desired, and it would seem that a hard asphalt, softened to a penetration less than approximately 150, may be the preferable material. The points $a$, $b$ and $c$ at FIG. 3 indicating the time interval of low stability, are indicative of actual conditions but the time interval is relative, and in any specific placement of the material, the time for commencement of stabilization, points $a$, $b$ and $c$ can be easily controlled and regulated by the amounts and types of diluent which may be used with the material, and by preliminary operations of mixing and aerating when desirable. For example, a large proportion of naphtha in the diluent will shorten the time interval, and a large proportion of kerosene will extend the period.

Only until the evaporation of the diluent from the cutback progresses to the point where the asphalt reaches a critical consistency, does the stability begin to increase, and after this critical consistency was reached, the rate of increase was observed to be comparatively rapid.

With continued evaporation of diluent, the asphalt imparts increasing strength and stability to the soil blend and the curves at FIG. 3 demonstrate that soil stabilized by the emulsified, softened hard-asphalt will have a stability not attainable with conventional types of emulsified asphalts. For example, with blends having a 4 percent asphalt content, the hard asphalt produced a stability of 850 p.s.i. (pounds per square inch) while the softer 120-150 and 40-50 penetration asphalts produced a stability of 100-150 p.s.i. With blends having a 6 percent asphalt content, the hard asphalt produced a stability of 1200 p.s.i., while the softer asphalts produced a stability between 300-340 p.s.i. With blends having an 8 percent asphalt content, the hard-asphalt produced a stability of 450-500 p.s.i.

The time required to attain maximum stability with the hard-asphalt blends varied with the asphalt content, the 4 percent asphalt content requiring approximately 1,000 hours, the 6 percent content approximately 1,500 hours and the 8 percent content approximately 2,000 hours. It is to be noted that these time periods can be considered only as being relative. In field installations, the rate of stabilization can be initially accelerated by blending, harrowing and other operations to loosen and aerate the soil to help the water and diluent evaporate before the soil blend is compacted, as by rolling to a finished structure.

The curves at FIG. 3 also suggest that the amount of emulsified asphalt to be blended with a soil should not exceed the available pore space in the soil. As previously noted, the 8 percent asphalt blend, volumetrically, closely approached the available pore space while both the blends having asphalt contents of 4 percent and 6 percent would provide some residual pore space which would permit evaporation of both the water and the diluent when the asphalts were curing and hardening.

The economies possible with the improved, emulsified, softening hard-asphalt herein set forth, is manifest in the fact that similar amounts of asphalt can be used to obtain greater degrees of stabilization of a soil blend, and a strength of from two to five times that possible with conventional asphalt emulsions. Another important advantage resides in the fact that soil may be used in situ without the need of adding imported fines or other materials, especially when a sandy soil deficient in fines is the only type available at the locale of the structure.

While I have now described my invention in considerable detail, it is obvious that others skilled in the art can blend and compound and produce alternate and equivalent products and compositions which are nevertheless within the spirit and scope of my invention. Hence, I desire that my protection be limited, not by the specific examples herein, but only by the proper scope of the appended claims.

I claim:
1. A process for forming an asphalt-stabilized soil structure, wherein the asphalt is characterized by having a penetration less than 25 and a comparatively low softening point, and including the steps of:
   (a) softening the asphalt with a volatile diluent to a penetration greater than 40;
   (b) emusifying the softened asphalt with water forming the continuous phase of the emulsion;
   (c) blending the emulsified, softened asphalt with soil;
   (d) forming and compacting the soil as the emulsion breaks and the water is dissipated from the mixture, to produce a structure having an initial low stability, established by the penetration of the softened asphalt, and allowing the diluent to evaporate to increase the stability thereof.

2. In the process set forth in claim 1 wherein said asphalt has a softening point temperature in degrees F. of approximately 185 less three times the penetration.

3. In the process set forth in claim 2 wherein the diluent has a volatility not substantially less than that of kerosene.

4. In the process set forth in claim 2 wherein the asphalt is softened to a penetration greater than 40 and less than 300.

5. In the process set forth in claim 2 wherein the asphalt is softened to a penetration greater than 40 and less than approximately 150.

6. In the process set forth in claim 2 wherein the volumetric proportion of asphalt blended with the soil does not exceed, and is somewhat less than the void content of the soil whereby to provide sufficient porosity in a compacted structure to facilitate evaporation of diluent therefrom.

References Cited

UNITED STATES PATENTS

| | | | |
|---|---|---|---|
| 3,206,174 | 9/1965 | Young | 94—46 X |
| 3,216,336 | 9/1965 | Benson | 94—23 |
| 3,253,521 | 5/1966 | Endres | 94—23 |
| 3,281,256 | 10/1966 | Rogers | 94—23 X |
| 3,330,677 | 7/1967 | Rogers | 94—23 X |

NILE C. BYERS, JR., *Primary Examiner.*